United States Patent [19]

McLaughlin

[11] Patent Number: 5,233,476
[45] Date of Patent: Aug. 3, 1993

[54] ELONGATE VEHICULAR REAR VIEW MIRROR

[76] Inventor: Don W. McLaughlin, 236 Eldridge St., Long Beach, Calif. 90807

[21] Appl. No.: 929,296

[22] Filed: Aug. 13, 1992

[51] Int. Cl.⁵ .......................... G02B 5/08; G02B 7/18; B60R 1/04
[52] U.S. Cl. .................................. 359/846; 359/847; 359/871; 248/467; 248/488
[58] Field of Search ............... 359/846, 847, 848, 855, 359/864, 865, 866, 871, 872; 248/467, 468, 476, 477, 478, 488, 491

[56] References Cited

U.S. PATENT DOCUMENTS

| | | | |
|---|---|---|---|
| 1,910,119 | 5/1933 | Moats | 359/847 |
| 1,986,033 | 1/1935 | Trufant | 359/846 |
| 2,664,785 | 1/1954 | Roehrig | 359/846 |
| 3,514,776 | 5/1970 | Mulready | 359/847 |
| 3,667,833 | 6/1972 | Baldwin, Sr. | 359/864 |
| 4,280,753 | 7/1981 | Neubauer | 359/846 |
| 4,733,956 | 3/1988 | Erickson | 248/467 |

FOREIGN PATENT DOCUMENTS 0400445 10/1933 United Kingdom ............... 359/846

*Primary Examiner*—Bruce Y. Arnold
*Assistant Examiner*—R. D. Shafer
*Attorney, Agent, or Firm*—Leon Gilden

[57] ABSTRACT

A flexible, shape-retentent rear view mirror is mounted to a support flange having a flange forward surface, with a positioning flange orthogonally and integrally mounted to an upper edge of the support flange. First and second mounting plates are positioned at opposed ends of the support flange in a coplanar relationship, with each lower edge of each mounting flange having a channel to receive the mirror plate therewithin to capture the mirror plate between the channels and the positioning flange. An arcuate spring plate having a convex forward surface projecting beyond the forward surface of the support flange is oriented between the support flange and the mirror to effect bowing of the mirror. Suction cups mount the organization to an interior surface of a vehicular windshield.

2 Claims, 4 Drawing Sheets

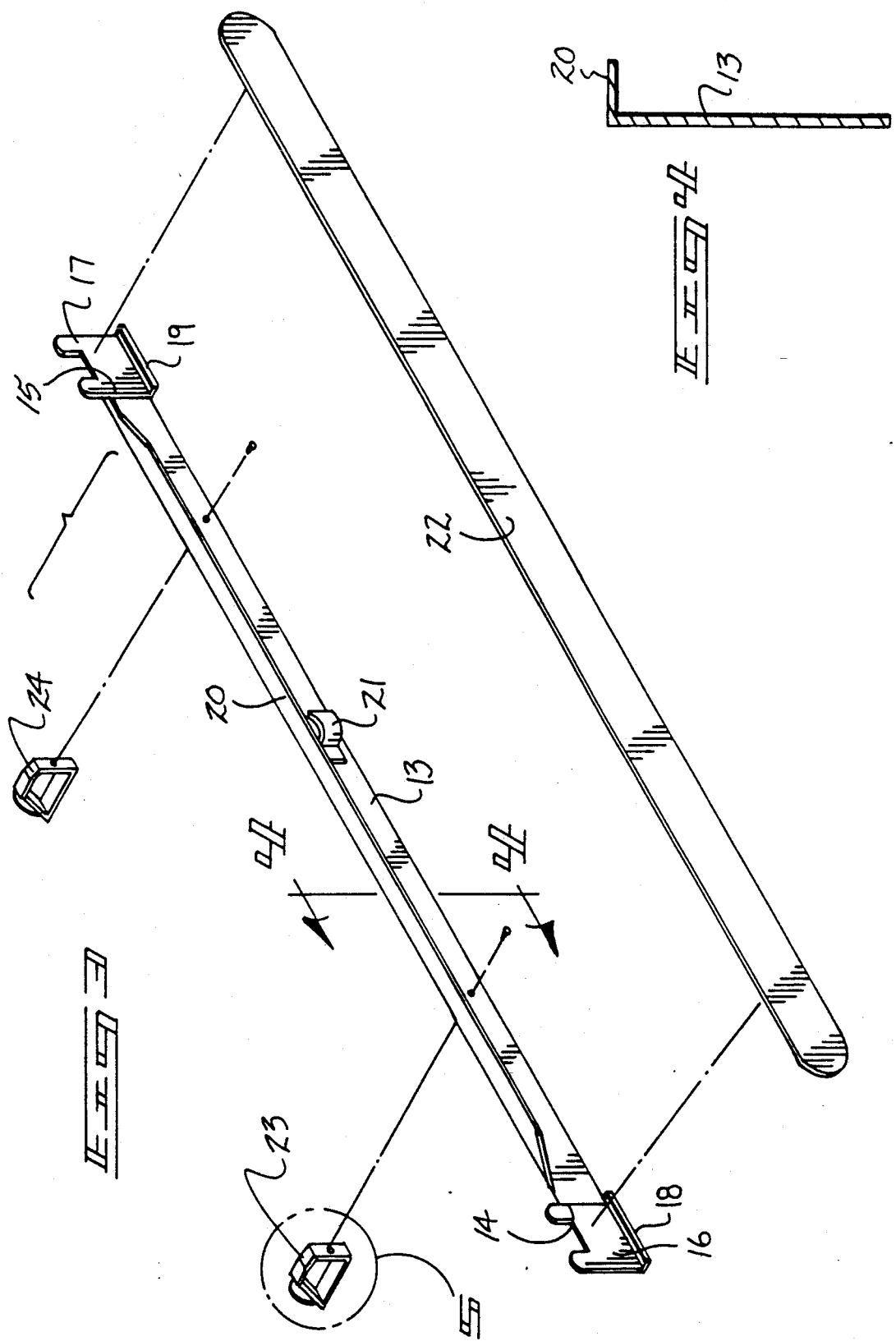

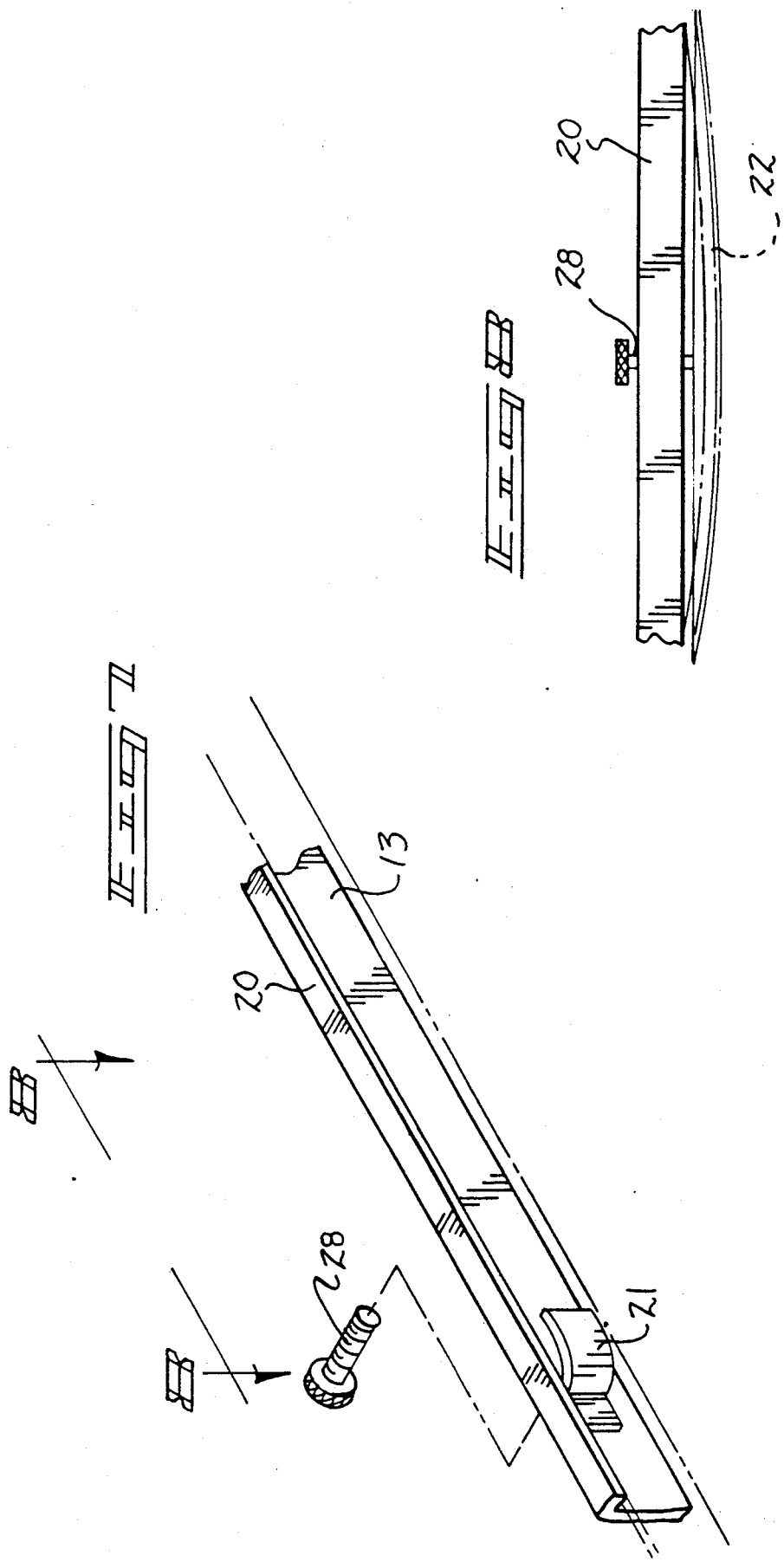

ELONGATE VEHICULAR REAR VIEW MIRROR

BACKGROUND OF THE INVENTION

1. Field of the Invention

The field of invention relates to rear view mirror structure, and more particularly pertains to a new and improved elongate vehicular reae view mirror wherein the same is arranged for effecting a rear view relative to a driver and passenger of an associated self-propelled vehicle.

2. Description of the Prior Art

Various convex mirror structure is utilized in association with a rear view mirror type structure and such is exemplified in the U.S. Pat. No. 4,834,521 to Dubs for mounting to a side view mirror surface.

U.S. Pat. No. 4,738,519 to Stewart sets forth a wide angle rear view mirror having a plurality of spaced mirror surfaces mounted therewithin.

Accordingly, the prior art has heretofore failed to provide for the elongate bowed mirror surface presented in the instant invention addressing a need to provide for ease of mounting and manipulation of the convex mirror surface of the instant invention and in this respect, the present invention substantially fulfills this need.

SUMMARY OF THE INVENTION

In view of the foregoing disadvantages inherent in the known types of rear view mirror apparatus now present in the prior art, the present invention provides an elongate vehicular rear view mirror wherein the same positions an elongate, convex mirror surface to an interior surface of a vehicular windshield. As such, the general purpose of the present invention, which will be described subsequently in greater detail, is to provide a new and improved elongate vehicular rear view mirror which has all the advantages of the prior art rear view mirror apparatus and none of the disadvantages.

To attain this, the present invention provides a flexible, shape-retentent rear view mirror mounted to a support flange having a flange forward surface, with a positioning flange orthogonally and integrally mounted to an upper edge of the support flange. First and second mounting plates are positioned at opposed ends of the support flange in a coplanar relationship, with each lower edge of each mounting flange having a channel to receive the mirror plate therewithin to capture the mirror plate between the channels and the positioning flange. An arcuate spring plate having a convex forward surface projecting beyond the forward surface of the support flange is oriented between the support flange and the mirror to effect bowing of the mirror. Suction cups mount the organization to an interior surface of a vehicular windshield.

My invention resides not in any one of these features per se. but rather in the particular combination of all of them herein disclosed and claimed and it is distinguished from the prior art in this particular combination of all of its structures for the functions specified.

There has thus been outlined. rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved elongate vehicular rear view mirror which has all the advantages of the prior art rear view mirror apparatus and none of the disadvantages.

It is another object of the present invention to provide a new and improved elongate vehicular rear view mirror which may be easily and efficiently manufactured and marketed.

It is a further object of the present invention to provide a new and improved elongate vehicular rear view mirror which is of a durable and reliable construction.

An even further object of the present invention is to provide a new and improved elongate vehicular rear view mirror which is susceptible of a low cost of manufacture with regard to both materials and labor, and which accordingly is then susceptible of low prices of sale to the consuming public, thereby making such elongate vehicular rear view mirrors economically available to the buying public.

Still yet another object of the present invention is to provide a new and improved elongate vehicular rear view mirror which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the invention in an exploded illustration.

FIG. 4 is an orthographic view, taken along the lines 4—4 of FIG. 3 in the direction indicated by the arrows.

FIG. 7 is a partial isometric illustration of the spring plate adjustably mounted relative to the support flange.

FIG. 8 is an orthographic view, taken along the lines 8—8 of FIG. 7 in the direction indicated by the arrows.

DESCRIPTION OF THE PREFERRED EMBODIMENT

Figure 1:
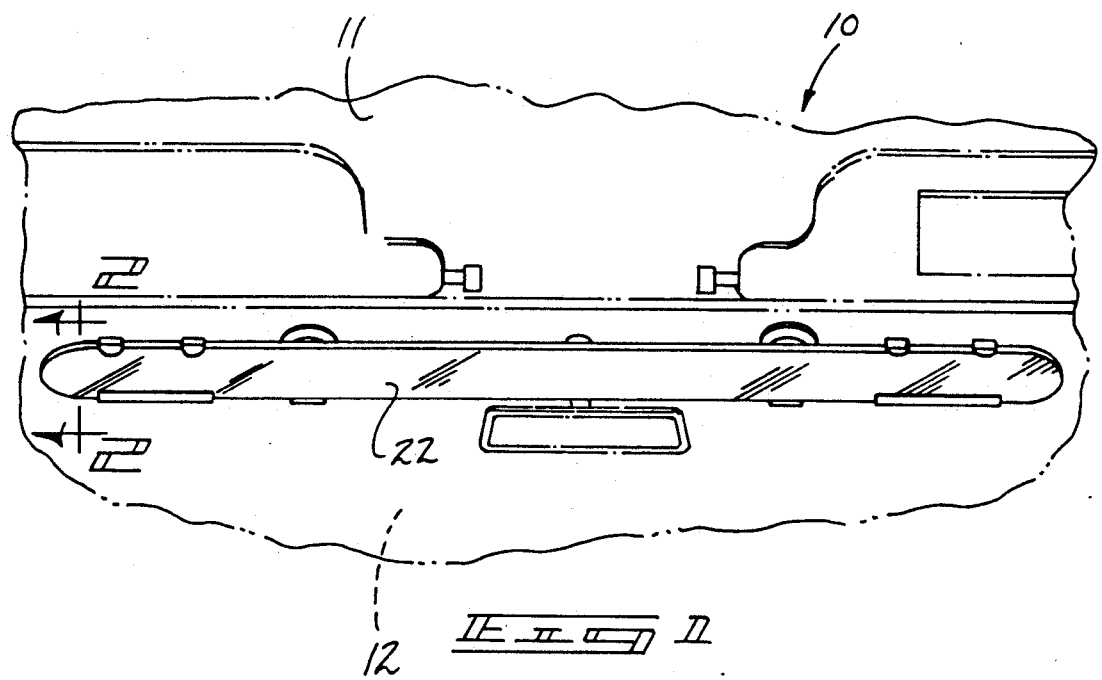
FIG. 1 is an orthographic view of the mirror mounted within an associated passenger compartment of a vehicle.

With reference now to the drawings, and in particular to FIGS. 1 to 8 thereof, a new and improved elongate vehicular rear view mirror embodying the principles and concepts of the present invention and generally designated by the reference numeral 10 will be described.

More specifically, the elongate vehicular rear view mirror 10 of the instant invention as exemplified in FIG. 1 mounted to an interior surface of a vehicular windshield 12 in adjacency to a vehicular roof panel 11 within an associated passenger compartment.

Figure 2:
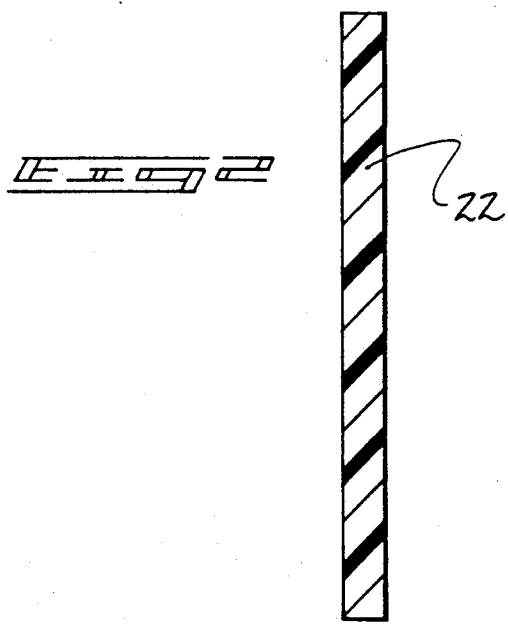
FIG. 2 is an orthographic view, taken along the lines 2—2 of FIG. 1 in the direction indicated by the arrows.
Figure 6:
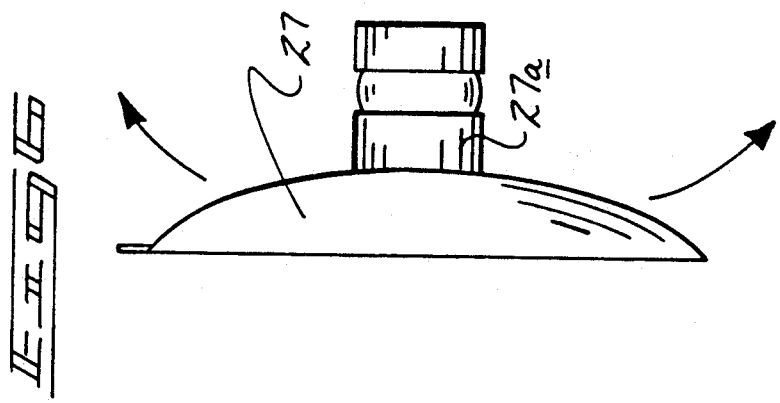
FIG. 6 is an orthographic side view of the suction cup structure utilized by the invention.
Figure 5:
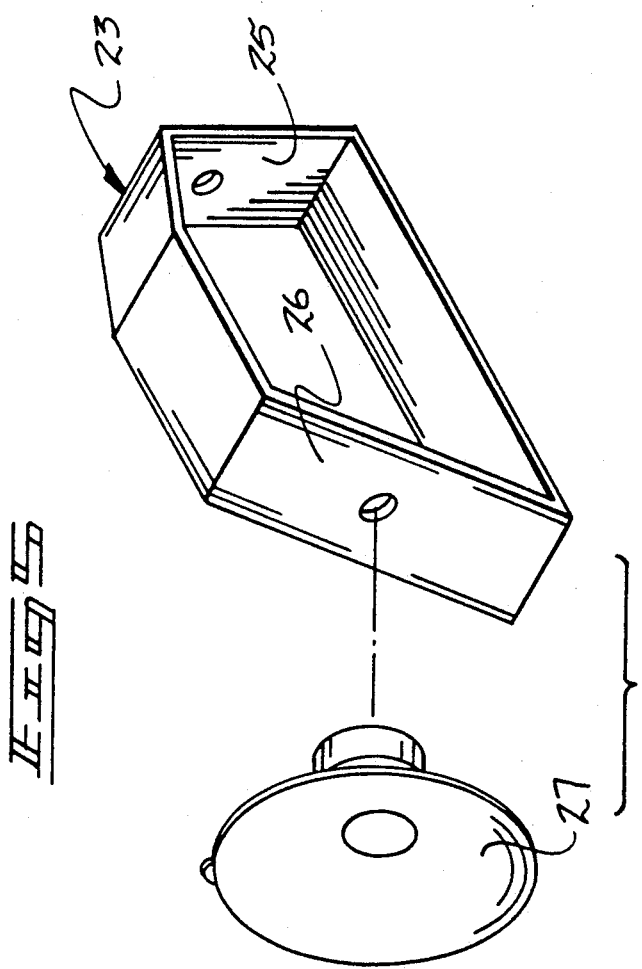
FIG. 5 is an isometric illustration of the suction cup structure utilized by the invention.

The rear view mirror organization includes a support flange 13 having a first end spaced from a second end, as the support flange is of an elongate construction, wherein the first end 14 includes a first end mounting plate 16, the second end 15 includes a second end mounting plate 17. The support flange 13 is longitudinally aligned with the first and second end mounting plates 16 and 17 coplanar with the support flange 13. A first channel 18 is mounted to a lower end of the first end mounting plate 16 in alignment with a lower edge of the support flange 13. A second channel 19 is longitudinally aligned or colinear with the first channel 18 in alignment with the lower edge of the support flange 13. A positioning flange 20 is fixedly and orthogonally mounted to an upper edge of the support flange 13 projecting overlying the forward surface of the support flange 13. An arcuate spring plate 21 is positioned medially of the first and second ends 14 and 15 projecting beyond the forward surface of the support flange 13 below the positioning flange 20. A flexible, shape retentent mirror 22 is captured between the positioning flange 20 and the first and second channels 18 and 19, with the arcuate spring plate 21 having a convex surface in contiguous communication with the mirror 22 positioned between the mirror 22 and the support flange 13. The mirror 22 is of a flexible, shape-retentent material accommodating deformation and effecting a springback to a longitudinally aligned relationship, as indicated in FIG. 2, when release from tension.

The rear surface of the support flange 13 includes respective first and second mounting loops 23 and 24 arranged in a spaced parallel relationship, each of a mirror image configuration relative to one another, and each including a first wall 25 in contiguous communication fixedly secured to the rear surface of the support flange 13. A second wall 26 is spaced from the first wall 25 and oriented at an oblique angle relative to the first wall 25. A suction cup 27 having a suction cup stem 27a directed through the second wall 26 is mounted through the second wall 26 to permit the suction cup 27 to effect pivoting deformation relative to the stem to accommodate various configurations of windshield surface.

The FIGS. 7 and 8 indicate the use of a threaded rod 28 orthogonally directed through the support flange 13 in contiguous communication with a concave surface of the spring plate 21 to effect flexure of the spring plate to permit the spring plate to be projected forwardly and effect an adjustable degree of arc or bending of the mirror 22 when mounted to the support flange 13.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An elongate vehicular rear view mirror comprising, a support flange, the support flange of a planar, elongate, longitudinally aligned configuration having a first end spaced from a second end, with the first end including a first end mounting plate, the second end including a second end mounting plate, with the first end mounting plate and the second end mounting plate coplanar relative to the support flange, and the support flange including a support flange forward surface and a support flange rear surface, the support flange further including a flexible shape-retentive mirror mounted to the support flange and to the first end mounting plate and the second end mounting plate, and the mirror is arranged in a spaced relationship relative to the support flange forward surface, and the support flange includes a positioning flange orthogonally and fixedly mounted to the support flange at an upper distal edge of the support flange projecting over the support flange forward surface, and the first end mounting plate includes a first channel, the second end mounting plate includes a second channel, with the first channel and the second channel colinear relative to one another oriented at a lower edge of the first end mounting plate and the second end mounting plate and positioned in adjacency relative to a support flange lower edge, with the mirror oriented between the positioning flange and the first channel and the second channel, and the support flange rear surface includes a first mounting loop and a second mounting loop oriented in a parallel mirror image relationship relative to one another, wherein each mounting loop includes a first wall contiguously mounted to the support flange rear surface, and a second wall spaced from the first wall oriented at an oblique angle thereto, wherein each second wall includes a suction cup member mounted thereto,
and
and arcuate spring plate, the arcuate spring plate interposed between the support flange forward surface and the mirror, and positioned medially of the support flange forward surface.

2. A rear view mirror as set forth in claim 1 including a threaded stem rod orthogonally and threadedly directed medially of the support flange, and the spring plate includes a concave surface in confronting relationship relative to the support flange forward surface and the threaded rod is in continuous communication with the spring plate concave surface to effect selective bowing of the spring plate for selective bowing of the mirror relative to the support flange.

* * * * *